United States Patent [19]
Parker

[11] 4,331,981
[45] May 25, 1982

[54] LINEAR HIGH GAIN SAMPLING AMPLIFIER

[75] Inventor: Robert P. Parker, Indianapolis, Ind.

[73] Assignee: RCA Corporation, New York, N.Y.

[21] Appl. No.: 190,595

[22] Filed: Sep. 25, 1980

[51] Int. Cl.$^3$ ............................................. H04N 5/68
[52] U.S. Cl. ..................................... 358/243; 358/74; 358/27
[58] Field of Search .................. 358/27, 29, 34, 64, 358/65, 74, 171, 172, 243; 328/139, 150, 151, 168–175; 307/350, 351, 352, 353

[56] References Cited

U.S. PATENT DOCUMENTS

| | | | |
|---|---|---|---|
| 2,792,496 | 5/1957 | Rhodes | 358/172 |
| 2,863,943 | 12/1958 | Luther | 358/174 |
| 2,930,843 | 3/1960 | Cooper | 358/34 |
| 3,543,169 | 11/1970 | Hill | 358/171 |
| 4,200,882 | 4/1980 | Janssen | 358/74 |
| 4,209,808 | 6/1980 | Harwood | 358/74 |
| 4,224,640 | 9/1980 | Hovens | 358/74 |

OTHER PUBLICATIONS

Cohen, "Sample and Hold Circuits Using FET Analog Gates", EEE.
Burd, et al., "High Performance Sample and Holds", Electronics Engineer, Dec. 1967, pp. 60–64.
National Semiconductor Linear Applications Handbook, p. AN20-7.

*Primary Examiner*—Michael A. Masinick
*Attorney, Agent, or Firm*—Eugene M. Whitacre; Paul J. Rasmussen; Ronald H. Kurdyla

[57] ABSTRACT

A signal sampling circuit comprising a switch network coupled to a transconductance amplifier for providing output currents proportional to input voltage, an input clamp network, and a charge storage device is disclosed. The amplifier signal input is clamped to a reference potential via a negative current feedback path when the switch occupies a first position during non-sampling, clamping intervals. During subsequent sampling intervals, the switch occupies a second position for decoupling the feedback path and coupling the amplifier output to the storage device, so that the storage device then develops a sample of amplifier output signals, referenced to the clamping potential, as a function of amplifier output currents.

16 Claims, 6 Drawing Figures

LINEAR HIGH GAIN SAMPLING AMPLIFIER

This invention concerns an arrangement particularly suitable for sampling a characteristic of low level electrical signals in a manner which minimizes distortion of an output sample due to effects such as offsets and nonlinearities which can be experienced in the process of sampling electrical signals.

In signal processing systems such as a television receiver for processing a composite television signal, there is a need to sample information contained in signals processed by the system. It is often necessary to provide significant amplification in the sampling process in order to obtain an information sample with a level large enough to be utilized effectively by circuits which are intended to process the information sample. This requirement is evident, for example, in a system for automatically controlling the bias of a kinescope in a color television receiver, as disclosed in a copending U.S. patent application Ser. No. 134,656 of W. Hinn, now U.S. Pat. No. 4,277,798 titled "AUTOMATIC KINESCOPE BIASING SYSTEM WITH INCREASED INTERFERENCE IMMUNITY" for example. In this system it is necessary to sample the (variable) amplitude of a small pulse of a few millivolts peak-to-peak amplitude, for the purpose of developing a control signal capable of automatically controlling kinescope bias over a range of several volts.

Signal sampling preferably should be accomplished so that offsets associated with the sampling process do not distort the output sample. In particular, in a sampling network with a significant amount of signal gain, amplification of sampling offsets should be avoided to prevent the output sample from being seriously distorted or obscured by the amplified offsets.

When small signals are sampled, the sampling network should provide a significant amount of amplification in order to develop an output sample of sufficiently large magnitude. This requirement is particularly evident when the sampling network is included in a closed loop servo control system which is intended to reduce the amount of control "slip" to an acceptably small or negligible level. In this context "slip" refers to the amount by which a servo system is unable to fully compensate for, or correct, a deviation from a desired steady state signal condition (i.e., the amount by which a system error cannot be fully corrected). Very high loop gain is typically required to reduce "slip" to a negligible amount.

Linear operation of the sampling network is also desirable in order to avoid distortion of the output sample. However, high gain sampling networks are typically prone to various forms of nonlinear operation due to inherent nonlinearities and in response to spurious signals such as noise, for example.

In some signal sampling systems it is necessary or advantageous to employ a reference voltage source for the purpose of re-referencing the signal to be sampled to a reference level before the signal is sampled. In such case it is desirable for the output sample to be substantially insensitive to variations of the reference voltage due to drift and temperature effects, for example.

Accordingly, in accordance with the principles of the invention there is disclosed herein a high gain, linear signal re-referencing and sampling network which is insensitive to offsets associated with the sampling process, and insensitive to variations of the reference voltage which is employed for signal re-referencing prior to sampling.

In accordance with the present invention, a circuit for sampling an input signal having a reference interval and a signal interval including a characteristic to be sampled comprises a transconductance amplifier with a signal input and a signal output for providing output currents varying in accordance with signal voltages applied to said signal input. Also included are a charge storage device, a clamping network coupled to the amplifier signal input, and a switching network coupled to the amplifier output and to the storage device. The switching network is timed to operate in response to timing signals including a clamping interval component corresponding to the reference interval of the input signal, and a sampling interval component corresponding to the signal interval of the input signal. The timing signals serve to activate the clamping network during the clamping intervals, and to inactivate the clamping network during the sampling intervals. The timing signals also render the switching network operative for coupling amplifier output currents to the charge storage device during the sampling intervals, and for decoupling the amplifier output from the charge storage device during the clamping intervals.

In accordance with a feature of the invention, the sampling circuit is included in a system for automatically controlling the black level current conducted by a kinescope in a television receiver, for deriving a signal sample representative of the level of kinescope black level current conduction.

Figure 1:
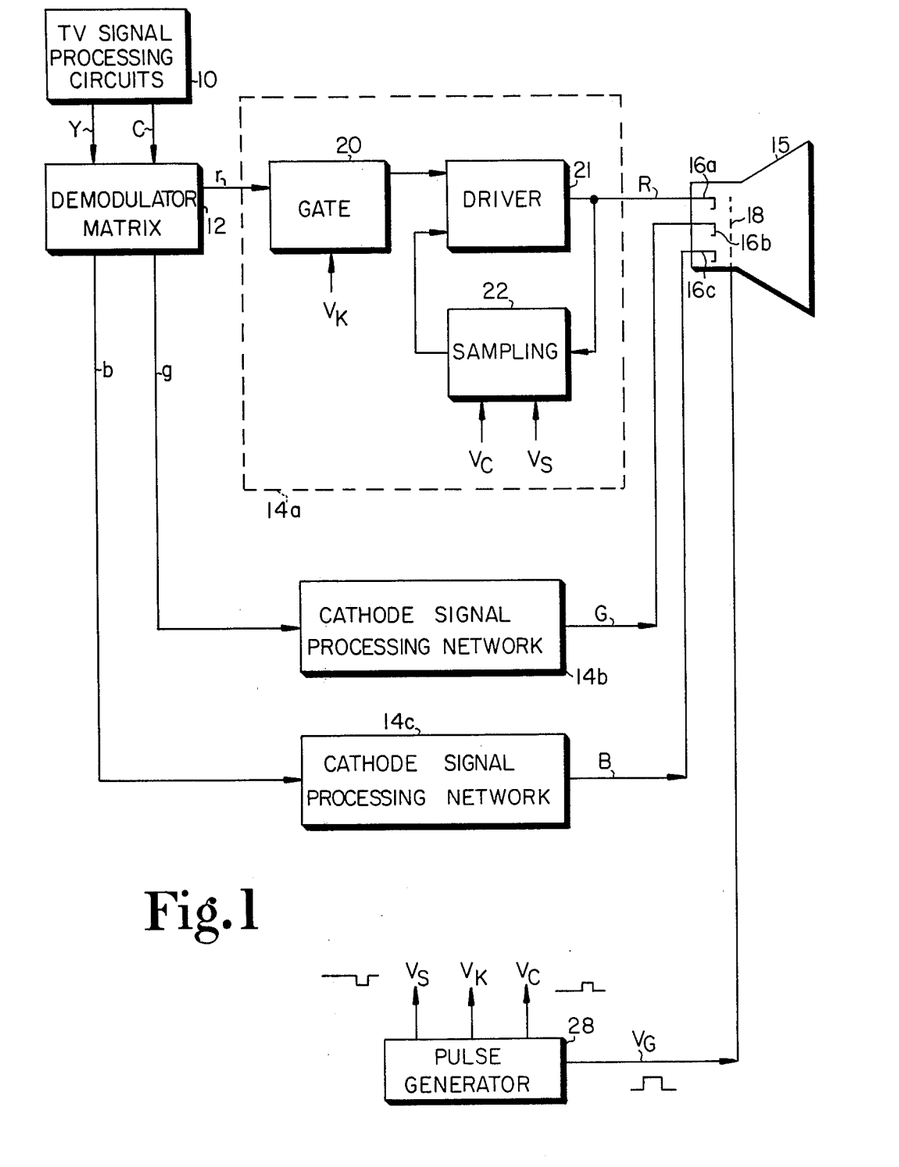
FIG. 1 illustrates a block diagram of a portion of a color television receiver including apparatus according to the present invention.

In FIG. 1, television signal processing circuits 10 (e.g., including video detector, amplifier and filter stages) provide separated luminance (Y) and chrominance (C) components of a composite color television signal to a demodulator-matrix 12. Matrix 12 provides output low level color image representative signals r, g and b. These signals are amplified and otherwise processed by circuits within kinescope cathode signal processing networks 14a, 14b and 14c, respectively, which supply high level amplified color image signals R, G and B to respective cathode intensity control electrodes 16a, 16b and 16c of a color kinescope 15. In this example, kinescope 15 is of the self-converging in-line gun type with a commonly energized grid 18 associated with each of the electron guns comprising cathode electrodes 16a, 16b and 16c. Since cathode signal processing networks 14a, 14b and 14c are similar in this embodiment, the following discussion of network 14a also applied to networks 14b and 14c.

In network 14a, a keyed gate 20 (e.g., an analog electronic switch) couples and decouples the r signal output from matrix 12 to a video signal input of a kinescope driver 21 in response to a keying signal $V_K$ produced by a pulse generator 28. Driver 21 includes a signal amplifier network for developing high level output signal R which is applied to kinescope cathode 16a. Cathode 16a is coupled to an input of a sampling network 22. Sampler 22 is keyed by a timing signal $V_C$ and by a timing signal $V_S$ (a complementary phase version of signal $V_C$) also produced by pulse generator 28, for developing an output control signal which is supplied to a bias control input of driver 21 for modifying the bias of amplifier circuits within driver 21 to control the black level current conducted by cathode 16a, as will be discussed.

Pulse generator 28 also generates an output voltage pulse $V_G$ during periodic intervals when the cathode current of kinescope 15 is to be monitored. This pulse exhibits a positive polarity and fixed amplitude (e.g., within a range of 10 to 20 volts), and is applied to kinescope grid 18 for forward biasing grid 18 during the monitoring intervals. The output of pulse generator 28 from which signal $V_G$ is provided also supplies an appropriate bias voltage for grid 18 at times other than the grid pulse interval.

Signals $V_S$, $V_C$, $V_K$ and $V_G$ from pulse generator 28 are synchronized with respect to the horizontal (line) retrace blanking intervals and the vertical (field) retrace blanking intervals of the television signal. These signals are generated during a period of time after the end of vertical retrace blanking, but before the beginning of the picture interval of the television signal containing picture information to be displayed by the kinescope. That is, these signals are generated during a portion of a larger time interval that encompasses a few horizontal lines during which picture information is absent. Specifically, signal $V_K$ renders gate 20 nonconductive for a period of time encompassing a reference or "set-up" interval of approximately four horizontal lines duration during which signal $V_C$ is developed, and for a subsequent monitoring interval of approximately two horizontal lines duration during which signals $V_G$ and $V_S$ are developed.

During the monitoring interval, the kinescope functions as a cathode follower in response to grid pulse $V_G$, wherein a similarly phased version of grid pulse $V_G$ appears at the kinescope cathode electrode during the monitoring interval. The amplitude of the induced cathode pulse is proportional to the level of cathode black level current conduction but is attenuated significantly relative to the grid pulse due to the relatively low forward transconductance of the kinescope electron gun grid drive characteristic. The amplitude of the induced cathode output pulse typically is very small, on the order of a few millivolts in this example.

Signal $V_K$ disables gate 20 during the reference and monitoring intervals so that the output of matrix 12 is then decoupled from driver 21 and kinescope 15. Sampling network 22 operates in response to signals $V_C$ and $V_S$ to provide an amplified output sample representative of the magnitude of the cathode output pulse induced by signal $V_G$. The output sample from network 22 is utilized to modify the bias operating point of driver 21, if necessary, in a direction to develop a (cathode) bias level at the output of driver 21 sufficient to produce a desired correct level of cathode black level current by closed loop action. Gate 20 is rendered conductive at other times to permit signals from matrix 12 to be coupled to the kinescope via driver 21.

Figure 2:
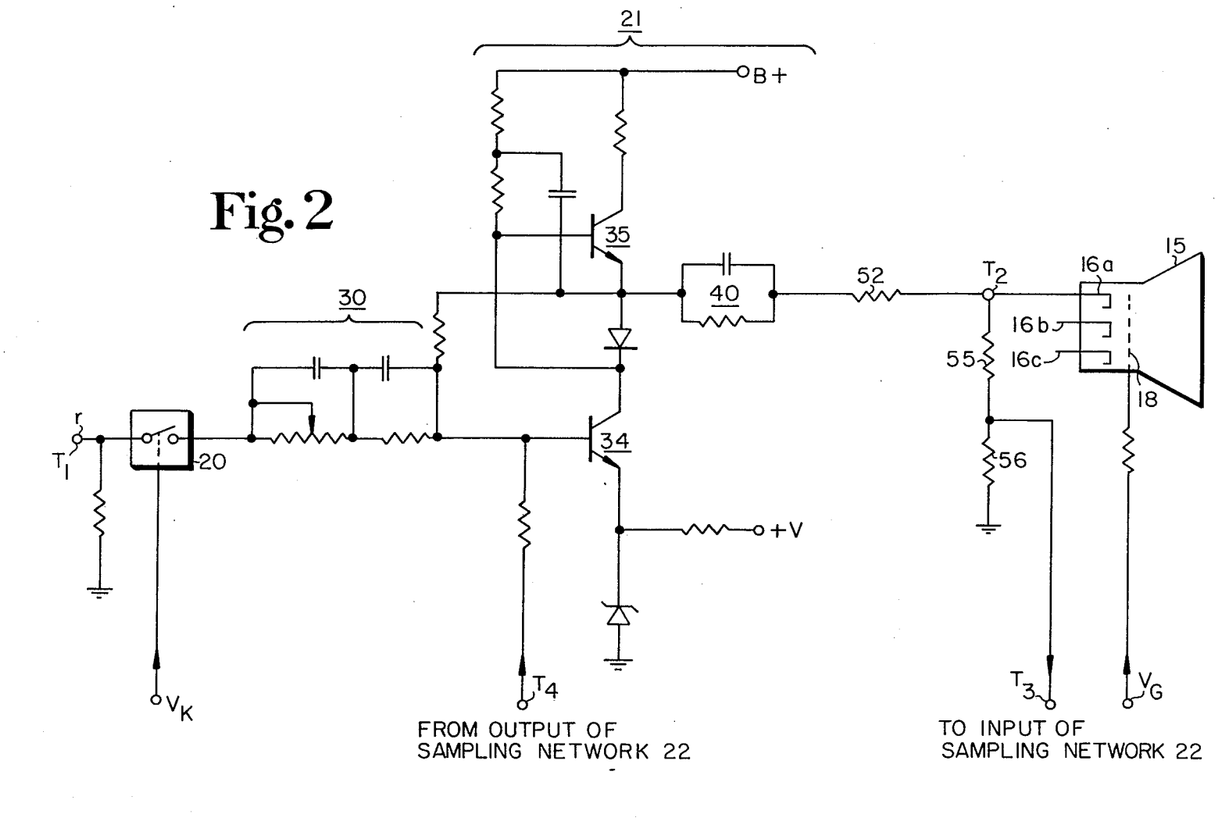
FIG. 2 shows a circuit arrangement of a portion of the receiver shown in FIG. 1.

FIG. 2 shows additional details of driver 21. Driver 21 comprises an amplifier transistor 34 and an active load circuit including a transistor 35. Under normal video signal processing conditions, the r color signal is coupled via a terminal $T_1$, gate 20 and an input circuit 30 to a base input of amplifier transistor 34. An amplified version of the input r is developed in the collector circuit of transistor 34, and is coupled to kinescope cathode 16a via an output coupling network 40, a resistor 52 and a terminal $T_2$. During the monitoring interval when input signal r is decoupled by means of gate 20, a black level representative bias voltage is developed at the output of driver 21, and an induced cathode output pulse representative of the cathode black level current level appears at terminal $T_2$. The cathode output pulse is sensed by means of a high impedance voltage divider including resistors 55 and 56, and the sensed cathode output pulse is coupled via a terminal $T_3$ to the input of sampling network 22. An output control voltage from sampling network 22 is applied to the base of amplifier transistor 34 via a terminal $T_4$. In this example, cathode black level current conduction is modified to increase and decrease as the base bias current of transistor 34 increases and decreases, respectively, in response to the output control voltage from sampling network 22.

Figure 3:
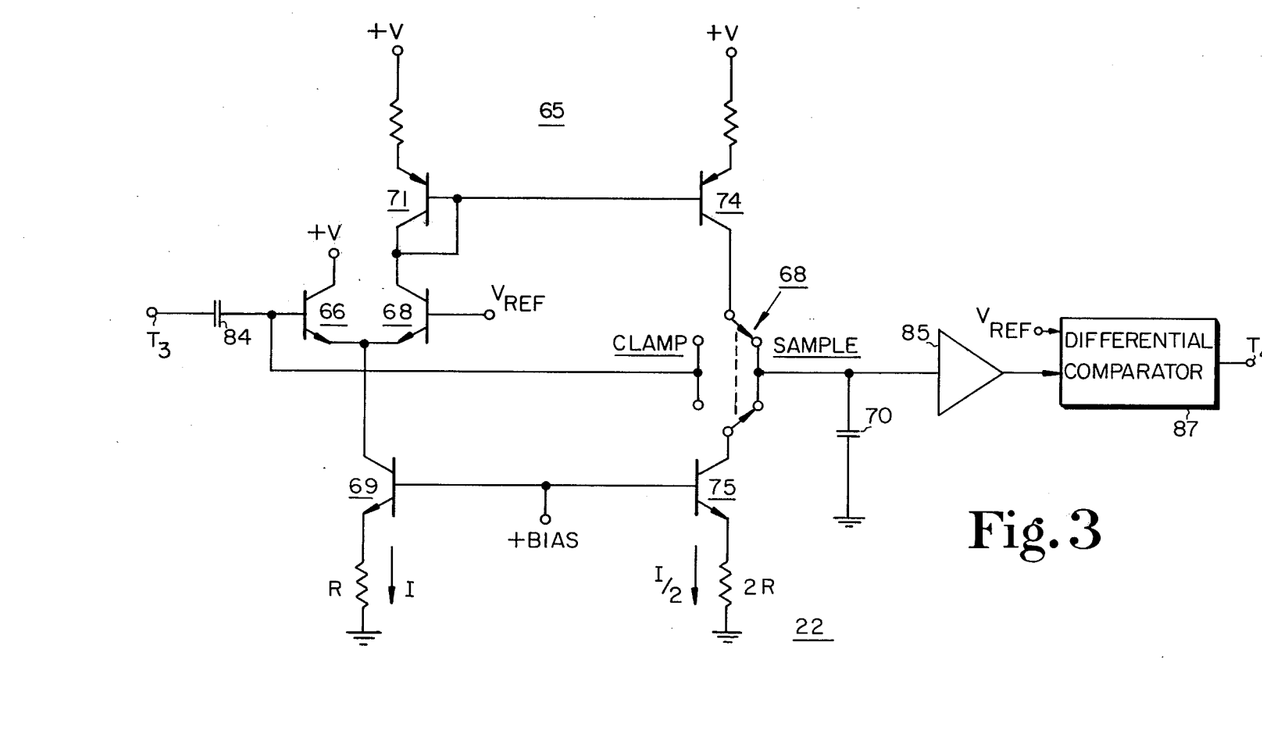
FIG. 3 shows a circuit arrangement of another portion of the receiver in FIG. 1, including a sampling network according to the present invention.

FIG. 3 shows sampling network 22 in greater detail. In FIG. 3, the cathode output pulse coupled via terminal $T_3$ is processed by a sample-and-hold circuit comprising a transconductance amplifier 65. Transconductance amplifier 65 produces an output current ($I_o$) at a high impedance as a function of input voltage ($V_i$) and the transconductance ($g_m$) of the amplifier (approximately five millimhos in this example) according to the expression: $I_o = V_i \times g_m$.

Amplifier 65 includes emitter coupled transistors 66 and 68 arranged in an input differential amplifier configuration, and a current repeater ("mirror") network including a diode connected transistor 71 and a transistor 74 arranged in the collector circuit of transistor 68 as shown. A first constant current source including a forward biased transistor 69 and an impedance R provides an operating current I for transistors 66 and 68. A second constant current source including a forward biased transistor 75 and an impedance 2R provides an operating current I/2 for transistor 74. A source of DC reference potential $V_{REF}$ is applied to a noninverting input of amplifier 65 at the base of transistor 68. The input signal to be sampled (i.e., the cathode output pulse) is coupled via terminal $T_3$ and a clamp capacitor 84 to an inverting input of amplifier 65 at the base of transistor 66.

A switching network 68 is coupled to the output circuit of amplifier 65 including transistors 74 and 75, to the input of amplifier 65 at the base of transistor 66, and to an average responding output charge storage capacitor 70. Switch 68 exhibits clamp and sample positions. An output current node of amplifier 65 corresponds to the interconnected collector electrodes of transistors 74 and 75. In the sampling position (as shown), switch 68 couples storage capacitor 70 to the collectors of output transistors 74 and 75 of amplifier 65. In the clamping position, capacitor 70 is decoupled from amplifier 65, and the collector electrodes of transistors 74 and 75 are coupled via switch 68 to capacitor 84 at the base of transistor 66. When in the clamping position, switch 68 completes a negative current feedback loop from the collector output of transistor 68 to the base input of transistor 66. Additional details of switch 68 are shown in FIG. 4.

Figure 4:
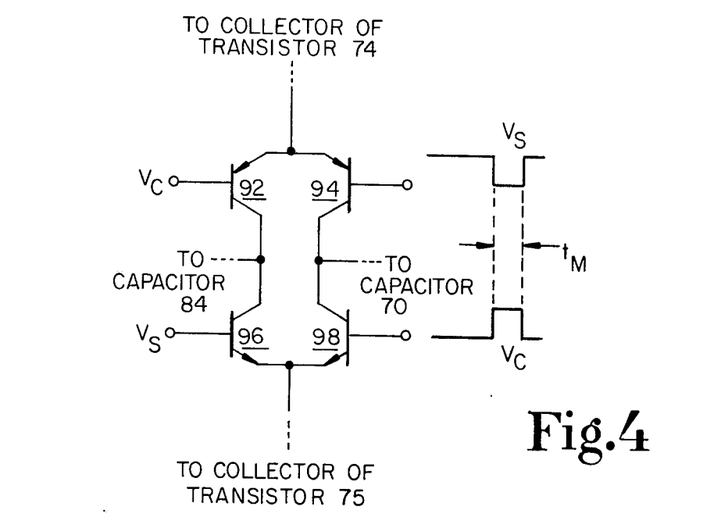
FIG. 4 illustrates additional details of a portion of the sampling network shown in FIG. 3.

In FIG. 4, switching network 68 is shown as comprising emitter coupled PNP transistors 92, 94 and emitter coupled NPN transistors 96, 98 arranged as shown. During monitoring intervals $t_M$ when input signals are to be sampled, transistors 94 and 98 are forward biased, and transistors 92 and 96 are reverse biased, in response to timing signals $V_C$ and $V_S$. Conversely, transistors 92 and 96 are forward biased and transistors 94 and 98 are reverse biased in response to signals $V_C$ and $V_S$ during the clamping reference intervals which precede the sampling intervals.

Continuing with the arrangement of FIG. 3, in order for the signal sample developed on storage capacitor 70 to accurately represent variations in the amplitude of the cathode output pulse being sampled, it is necessary to establish a reference level for the signal being sampled. This is accomplished during the clamping reference interval preceding the sampling or monitoring interval.

During the clamping reference interval, the collector output of transistor 68 is coupled to capacitor 84 at the base input of transistor 66 via diode connected transistor 71, transistor 74 and switch 68 to form a negative current feedback path. Output storage capacitor 70 is decoupled from amplifier 65 at this time. Capacitor 84 charges via currents conducted by transistors 68, 71 and 74 until the base voltages of transistors 66 and 68 are substantially equal (i.e., the differential input voltage of amplifier 65 is substantially zero). At this time current I sourced by transistor 69 divides equally between the collector currents of transistors 66 and 68, whereby the collector currents of transistors 68 and 74 equal the collector current (I/2) conducted by transistor 75. Therefore all of the collector current conducted by transistor 74 flows as collector current in transistor 75. The described current feedback path settles to a zero current condition prior to the end of the clamping interval, at which time transistor 75 "sinks" all of the collector current conducted by transistor 74 and zero feedback current flows to the base of transistor 66 and capacitor 84.

Figure 5:
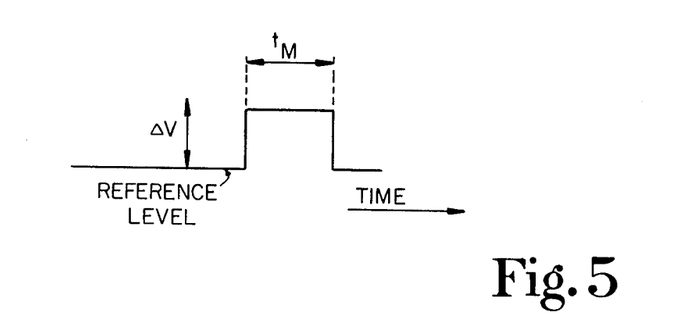
FIG. 5 depicts a waveform helpful in understanding the operation of the sampling network shown in FIG. 3.

Thus by current feedback action the base input of transistor 66 is clamped to a DC level as a function of $V_{REF}$, in cooperation with capacitor 84, during the clamping reference interval. The effect of this input clamping action can be seen from the waveform of FIG. 5, wherein the positive-going cathode output pulse occurring during monitoring interval $t_M$ exhibits a (variable) peak-to-peak amplitude $\Delta V$ with respect to a reference level developed as a function of $V_{REF}$.

During the subsequent monitoring interval when capacitor 70 is coupled to the output of amplifier 65 via switch 68, the pre-existing charge on capacitor 70 remains unchanged unless the input signal applied to terminal $T_3$ and capacitor 84 is sufficient to alter the balanced base bias of transistor 66 as established during the preceding clamping reference interval. For example, an increase in the base voltage of transistor 66 induced by an increase in the amplitude of the input pulse to be sampled causes a corresponding decrease in the collector current of transistor 68, and also in the collector current of transistors 71 and 74 due to current repeater action. Capacitor 70 then discharges via transistor 75 by an amount corresponding to the decreased current conduction of transistor 74, to thereby reduce the voltage on capacitor 70. In this instance transistor 75 acts as a current sink with respect to discharging of capacitor 70. Similarly, a decrease in the base voltage of input transistor 66 causes a corresponding increase in the collector current of output transistor 74. Capacitor 70 charges via transistor 74 in response to this increased current conduction, whereby the voltage on capacitor 70 increases. In this case transistor 74 acts as a current source with respect to charging of capacitor 70.

The voltage sample developed on capacitor 70 during the monitoring intervals is proportional to the difference between the clamping reference level, and the amplitude of the cathode output pulse which represents the level of cathode black level current conduction. The voltage stored on capacitor 70 is supplied via a unity gain buffer network 85 (e.g., with a high input impedance on the order of $10^9$ ohms) to one input of a differential comparator 87. A reference voltage corresponding to $V_{REF}$, for example, is applied to another input of comparator 87. Comparator 87 responds to the input voltages for providing a control signal at an inverting output representative of the difference between the input reference voltage and the voltage sample for capacitor 70. This control voltage is supplied via a terminal $T_4$ to video driver 21 (FIG. 2) for controlling the bias thereof in a direction to compensate for excessively high or low black level current conduction by means of closed loop servo action.

The described sampling system including transconductance amplifier 65 exhibits several significant advantages.

Variations in the level of reference voltage $V_{REF}$ from one clamping interval to the next do not impair the accuracy of the signal sample developed on output capacitor 70 during the sampling intervals. Stated otherwise, the amplifier output currents (corresponding to the currents conducted by output transistors 74 and 75 for charging and discharging capacitor 70) track predictably with variations of the input signal, and remain proportional to the product of the amplifier transconductance ($g_m$) and the input voltage, even if $V_{REF}$ varies from one reference interval to the next. This result is achieved because the feedback current flowing during the clamping intervals settles to a balanced zero current condition (as discussed), whereby the feedback current and the net amplifier output current are zero prior to the end of the clamping reference interval. Thus immediately before the beginning of the sampling interval, the currents conducted by input transistors 66 and 68 are equal, and all of the collector current of output transistor 74 is conducted by output transistor 75. Therefore there is no net current flow to or from output capacitor 70 at the beginning of the sampling interval even if $V_{REF}$ changes in value from one reference interval to the next, unless the input signal changes to produce an input voltage imbalance with a corresponding output current imbalance.

The signal sample developed on output capacitor 70 is unaffected by voltage offsets associated with amplifier 65 and switch 68. For example, during clamping reference intervals and balanced zero current condition discussed previously serves to negate the effects of offsets. During sampling intervals, any voltage offset associated with switch 68 (as well as any voltage offset developed between the output of amplifier 65 and capacitor 70) has no effect on the output sample, since the sample developed on capacitor 70 is a function of output currents conducted by output transistors 74 and 75 as discussed, rather than being a function of an output voltage.

The described closed loop control system including amplifier 65 exhibits sufficiently high gain to reduce loop control "slip" to a negligible amount, even though the transconductance gain ($g_m$) of amplifier 65 is not uncommonly large. Even with the high gain provided by amplifier 65, amplifier 65 exhibits a linear transfer function in the presence of spurious input signals such as noise. In this example, amplifier 65 is intended to amplify an input signal with a magnitude on the order of a few millivolts. The transfer characteristic remains linear and the output sample is not distorted even in the presence of relatively high levels of input noise (e.g., on the order of a few tens of millivolts) such as may include white noise, thermal noise, and horizontal rate deflection noise. Such high levels of noise are unlikely to cause the dynamic range of amplifier 65 to be exceeded by saturating the output devices, or cause the output current capability of amplifier 65 to be exceeded. For example, input noise on the order of twenty millivolts produces an amplifier output current of one milliampere, which is well within the output current capability of amplifier 65.

The duration of the sampling interval (two horizontal lines in this example) is chosen to correspond to a period of time wherein the average value of noise likely to be encountered in a television receiver environment is zero. Such noise produces substantially no distortion of the sample developed by capacitor 70, due to averaging action of capacitor 70 and because capacitor 70 is current driven (charged and discharged) by means of output currents from amplifier 65. Thus the average charge stored on capacitor 70 in response to such noise over the monitoring interval will exhibit substantially no difference compared to the stored charge that would be expected in the absence of noise.

Figure 6:
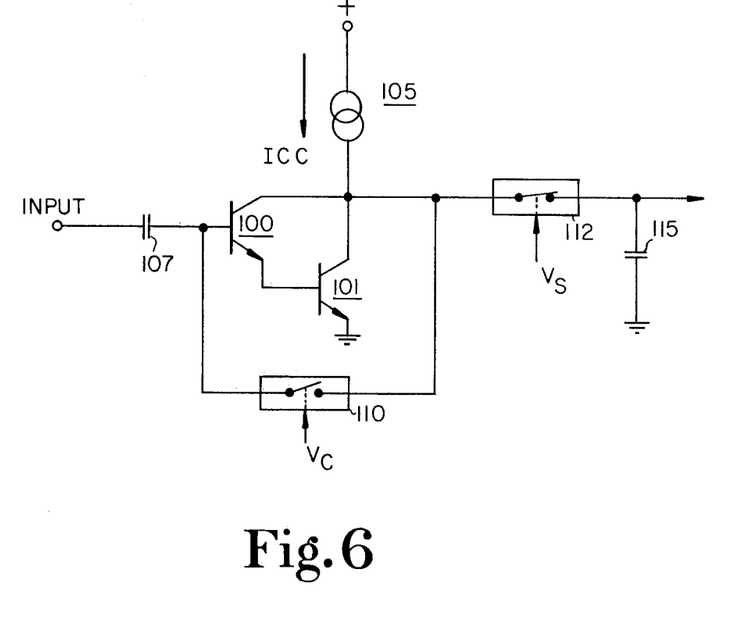
FIG. 6 shows an alternate arrangement of a portion of the circuit in FIG. 3.

FIG. 6 shows an alternative version of the sampling network shown in FIG. 3. The arrangement of FIG. 6 comprises a transconductance amplifier including transistors 100 and 101 arranged as a high gain high input impedance Darlington amplifier configuration. The collector currents of transistors 100 and 101 are supplied via a constant current source 105. Input signals to be sampled are coupled to a base input of transistor 100 via a clamping capacitor 107. An electronic switch 110 conducts only during the clamping reference intervals in response to signal $V_C$ for providing a clamping reference voltage at the base input of transistor 100 in accordance with the collector output potential of transistors 100, 101. An electronic switch 112 conducts only during the sampling intervals in response to signal $V_S$ to couple a storage capacitor 115 to the collector output of transistor 101 for developing a signal sample on capacitor 115. The output sample can afterwards be processed as shown in FIG. 3.

What is claimed is:

1. A circuit for sampling an input signal having a reference interval and a signal interval including a characteristic to be sampled, comprising:
   a transconductance amplifier with a signal input for receiving said input signal and an output for providing output currents varying in accordance with signal voltages applied to said signal input;
   a charge storage device;
   a switching network coupled to said amplifier output and to said charge storage device;
   a clamping network coupled to said amplifier signal input;
   a source of timing signals including a clamping interval component corresponding to said reference interval of said input signal, and a sampling interval component corresponding to said signal interval of said input signal; and
   means for utilizing said timing signals to activate said clamping network during said clamping intervals and to inactivate said clamping network during said sampling intervals; and to render said switching network operative for coupling amplifier output currents to said charge storage device during said sampling intervals so that said storage device develops a signal sample in response to said amplifier output currents, and for decoupling said amplifier output from said charge storage device during said clamping intervals.

2. A circuit according to claim 1, wherein:
   said switching network includes means responsive to said timing signals for coupling said amplifier output to said amplifier input via a negative current feedback path during said clamping intervals.

3. A circuit according to claim 2, wherein:
   said transconductance amplifier additionally includes a reference input coupled to a reference potential, so that a clamping reference voltage is provided for said clamping network during said clamping intervals in accordance with said reference potential.

4. A circuit according to claim 1, wherein:
   said clamping network includes a capacitor arranged to couple said signals to be sampled to said amplifier input.

5. A circuit according to claim 4 and further comprising:
   means for processing said signal sample; and
   high input impedance buffer means for coupling said sample to said processing means.

6. A circuit according to claims 1 and 2 in a system including a signal processing channel, wherein:
   said amplifier signal input is coupled to a first point in said signal processing channel; and
   said amplifier output is coupled to a second point in said signal processing channel prior to said first point to form a closed control loop.

7. A circuit according to claims 1 or 2, wherein said transconductance amplifier comprises:
   first and second active devices arranged in a differential input configuration, said first device including an input electrode coupled to said signals to be sampled, an output electrode, and a common electrode; said second device including an input electrode coupled to a reference potential, an output electrode, and a common electrode coupled to said common electrode of said first device;
   a first current source coupled to said common electrodes of said first and second devices for providing operating currents for said first and second devices;
   a current repeater network coupled to said second device for replicating output currents conducted by said second device, said current repeater network including a third active device with a current output;
   a second current source coupled to said current output of said third device, for providing operating currents for said third device.

8. A circuit according to claim 7, wherein:
   said second current source provides a current substantially equal to the current conducted by said second device when the input voltages of said first and second devices are substantially equal.

9. A circuit according to claim 7, wherein:
said signals to be sampled are coupled to said input of said first device via a clamping capacitor.

10. A circuit according to claim 9, wherein:
said switching network couples said current output of said third device to said clamping capacitor at said input of said first device, and decouples said third device from said charge storage device, during said clamping intervals; and
said switching network decouples said third device from said input of said first device, and couples said current output of said third device to said charge storage device during said sampling intervals.

11. A circuit according to claim 10, wherein:
said first and second devices respectively comprise first and second transistors with a main current conduction path defined by said output and common electrodes;
said third device comprises a third transistor;
said second current source comprises a fourth transistor with a main current conduction path arranged serially with and similarly poled for current conduction with respect to the main current conduction path of said third transistor; and
said switching network coupled said charge storage device to a point between said main current conduction path of said third transistor and said main current conduction path of said fourth transistor during said sampling intervals.

12. A circuit according to claim 1, wherein said transconductance amplifier comprises:
a signal inverting amplifier including a transistor with a signal input electrode, and output and common electrodes defining a main current conduction path of said transistor; and
a source of substantially constant current coupled to said output electrode.

13. In combination with a system for automatically controlling the black level current conducted by a kinescope in a television receiver, said system including an image reproducing kinescope with an intensity control electron gun comprising a cathode electrode; means for coupling video signals including periodic image display and image blanking intervals to said electron gun; and means for deriving a signal representative of the cathode current conduction level during periodic monitoring intervals within said blanking intervals; a circuit for sampling said representative signal to provide a control voltage, comprising:
a transconductance amplifier with a signal input for receiving said representative signal and an output for providing output currents varying in accordance with signal voltages applied to said signal input;
a charge storage device;
a switching network coupled to said amplifier output and to said charge storage device;
a clamping network coupled to said amplifier signal input;
a source of timing signals including a clamping interval component occurring during an interval prior to said monitoring interval, and a sampling interval component occurring during said monitoring intervals;
means for utilizing said timing signals to activate said clamping network during said clamping intervals and to inactivate said clamping network during said sampling intervals; and to render said switching network operative for coupling amplifier output currents to said charge storage device during said sampling intervals so that said storage device develops a signal sample in response to said amplifier output currents, and for decoupling said amplifier output from said charge storage device during said clamping intervals; said
means for utilizing said sample to develop said control voltage for modifying the bias of said kinescope so as to produce a desired level of kinescope black level current conduction.

14. A circuit according to claim 13, wherein:
said switching network includes means responsive to said timing signals for coupling said amplifier output to said amplifier input via a negative current feedback path during said clamping intervals.

15. A circuit according to claim 14, wherein:
said transconductance amplifier additionally includes a reference input coupled to a reference potential, so that a clamping reference voltage is provided for said clamping network during said clamping intervals in accordance with said reference potential.

16. A circuit according to claim 15, wherein:
said clamping network includes a capacitor arranged to couple said representative signal to said amplifier input.

* * * * *